US 6,616,111 B1

(12) United States Patent
White

(10) Patent No.: US 6,616,111 B1
(45) Date of Patent: Sep. 9, 2003

(54) HAND HELD ELECTRONIC DEVICE OR GAME IMPACT PROTECTOR

(76) Inventor: Gabriel A. White, 20861 Crestview La., Huntington Beach, CA (US) 92646

( * ) Notice: Subject to any disclaimer, the term of this patent is extended or adjusted under 35 U.S.C. 154(b) by 0 days.

(21) Appl. No.: 10/216,991

(22) Filed: Aug. 12, 2002

(51) Int. Cl.[7] .................................................. A47F 5/00
(52) U.S. Cl. .................. 248/309.1; 206/320; 248/176.1
(58) Field of Search ............................. 248/309.1, 310, 248/314, 176.1; 220/8; 206/320, 305, 328, 334, 216, 591

(56) References Cited

U.S. PATENT DOCUMENTS

| 4,824,059 | A | * | 4/1989 | Butler ..................... 248/176.1 |
|---|---|---|---|---|
| 4,925,149 | A | * | 5/1990 | DiFrancesca et al. ....... 248/687 |
| 5,305,980 | A | * | 4/1994 | Le Blanc .................. 248/309.1 |
| 5,368,159 | A | * | 11/1994 | Doria ......................... 206/320 |
| 5,648,757 | A | * | 7/1997 | Vernace et al. ............. 340/539 |
| 5,859,628 | A | * | 1/1999 | Ross et al. .................. 345/173 |
| 5,996,956 | A | * | 12/1999 | Shawver .................. 248/309.1 |
| 6,520,466 | B1 | * | 2/2003 | Blanchard et al. ....... 248/309.1 |

* cited by examiner

Primary Examiner—Ramon O. Ramirez

(57) ABSTRACT

An elastomeric impact protector includes one trough-like piece conformed to receive one edge of an electronic device attached along one edge of a generally X-shaped elastomeric web. A set of corner receiving pockets at the free ends of the web are then engageable to the opposite edge of the device by stretching the web. The piece and the pockets are each formed to a thickness to extend beyond the plane of the corresponding surface of the device captured therein.

7 Claims, 2 Drawing Sheets

HAND HELD ELECTRONIC DEVICE OR GAME IMPACT PROTECTOR

BACKGROUND OF THE INVENTION

1. Field of the Invention

The present invention relates to impact protection devices, and more particularly to aftermarket resilient shields conformed to engage the edges of hand held electronic assemblies and to attenuate the impact energy imposed-thereto.

2. The Prior Art

The use of hand held electronic devices has proliferated in the recent past, along with, however, an increasing frequency of those inadvertently dropped and damaged by the consequent impact. As the complement of such hand held devices increases in our daily processes the attention and care we give them decreases and the loss rates are soaring. Such losses, however, are particularly troublesome when devices that serve as our notebooks, palm held e-mail communication terminals or even memory devices that record addresses and telephone numbers are destroyed since it is not just the cost of replacement that is incurred but also the loss of the information collected therein. Protection from such inadvertent loss is therefore a matter of universal concern.

In the past there have been various shock attenuation structures devised which in one way or another cushion the dropping impact. Examples of such devices can be found in the teachings of U.S. Pat. No. 4,925,149 to DiFrancesca et al; U.S. Pat. No. 5,368,159 to Doria; U.S. Pat. No. 4,824,059 to Butler; and U.S. Pat. No. 5,002,184 to Lloyd. While suitable for the purposes intended each of the foregoing describes elaborate, multi-element foam rubber structures, which are costly to produce, and/or which often conceal or obstruct access to the controls by which the protected device is operated.

A universally useful impact attenuation structure is therefore sought and it is one such structure that is disclosed herein.

SUMMARY OF THE INVENTION

Accordingly it is the general purpose and object of the present invention to provide an impact attenuation elastomeric apparatus including a plurality of edge capturing structures connected to each other by a resilient web.

Other objects of the invention are to provide a resilient apparatus conformed to elastically capture and shield from impact the edges of various electronic devices.

Yet additional objects of the invention are to provide a universally adaptable impact attenuation apparatus useful in shielding various electronic devices from impact.

Briefly, these and other objects are accomplished within the present invention by providing a generally rectangular elastomeric recess conformed for elastic expansion to receive one edge of an electronic device attached proximate its ends to an elastomeric web which, in turn, is attached to two opposed pockets which upon the stretching of the web capture the corners of the opposite edge of the device. Preferably, the web, pockets and the recess piece are all formed by casting or molding as a single, common structure of one of the several generally known elastomers including those in the latex group or one of the several silicon or latex polymers that are each associated with some substantial internal energy dissipation by hysteresis or heat. These are each formed to a sectional dimension sufficient to project beyond the surfaces of the device captured therein to provide a resilient modulus in combination with the mass of the device for attenuating the major spectra of the impact energy imposed to the device when dropped. Additional energy dissipation is thereafter realized in the frictional interface between the attenuation apparatus and the device itself. In this manner an inexpensive impact attenuation structure is devised which is easily conformed to electronic devices of various dimensions.

DESCRIPTION OF THE PREFERRED EMBODIMENT

Figure 1:
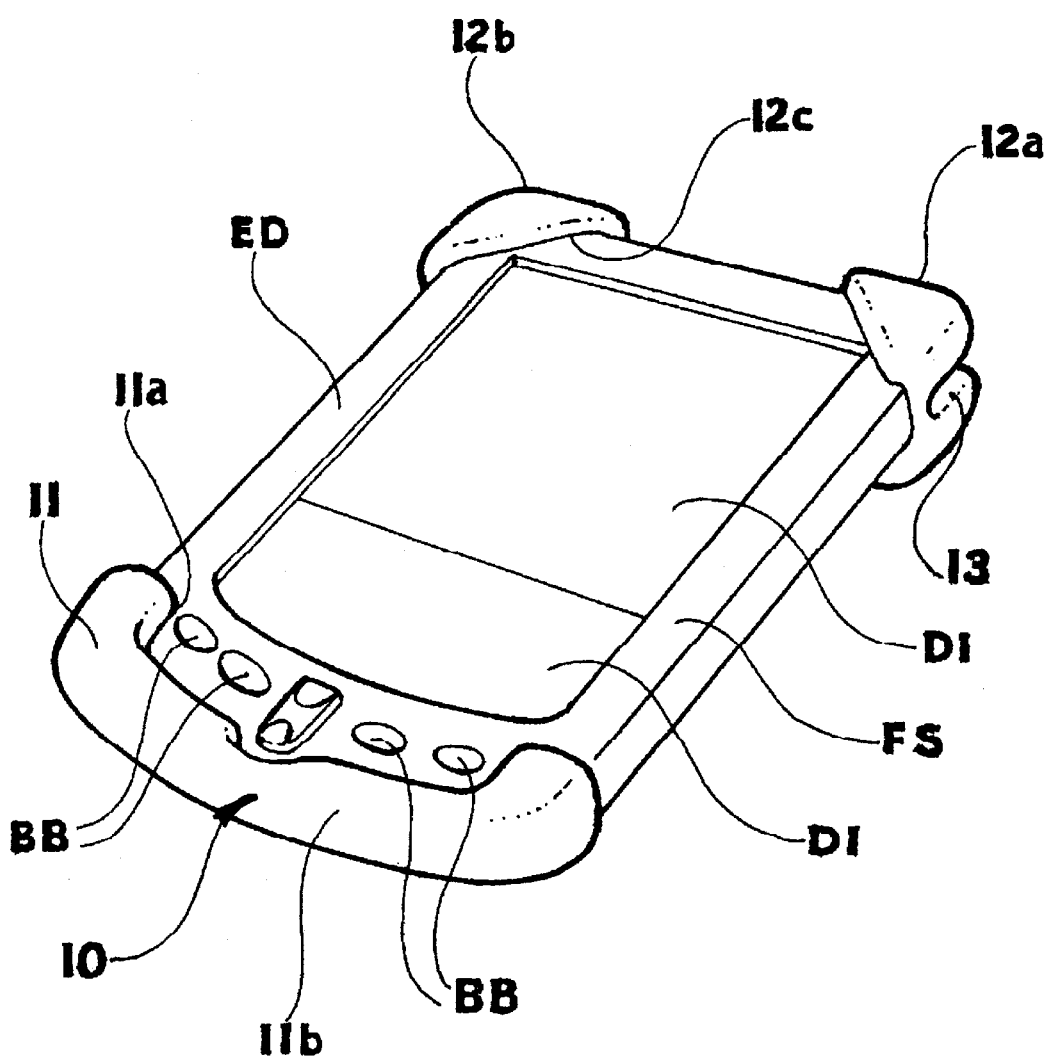
FIG. 1 is a perspective illustration of the inventive impact attenuation apparatus exposing the front surface of an electronic device received therein.
Figure 2:
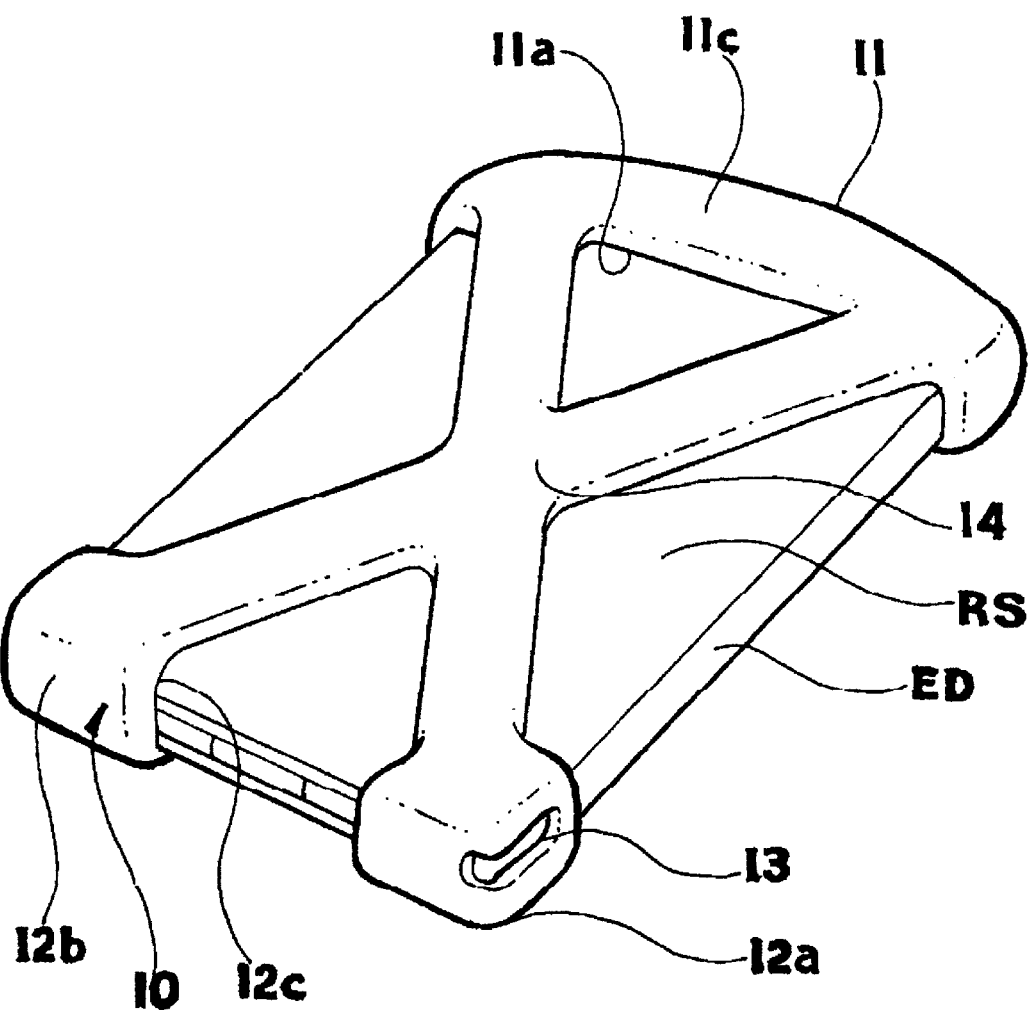
FIG. 2 is a further perspective illustration of the inventive attenuation apparatus illustrating the rear structural components thereof

As shown in FIGS. 1 and 2, the inventive protective apparatus, generally designated by the numeral 10, is conformed to capture one edge of a hand held electronic device ED in the interior of an elongate, generally trough-shaped, resilient receiving piece 11 closed at each end to define a pocket 11a that preferably is of a somewhat smaller dimension than the corresponding received edge of device ED. In consequence some stretching of the receiving piece 11 is necessary to receive the device ED, assuring retention thereof. The device ED may be one of several kinds of palm held computing or communicating devices, like a hand help personal computer, or even a portable game, and therefore includes a face surface FS on which various displays DI may be positioned adjacent various switches and manual buttons BB for the effective use of the device. Of course, these need to remain exposed and for that reason the structure 11b of the receiving piece 11 overlying the face surface FS may include cut-off portions exposing such access.

The opposite structure 11c of the receiving piece 11 overlies the passive rear surface RS of the device ED and therefore may be attached to the ends of an X-shaped resilient web 14 that at its other ends ties to corresponding separate corner pieces 12a and 12b. Again, in order to provide a retaining engagement the dimensions of the web 14 are smaller than the plan form dimensions of the rear surface RS and therefore need to be stretched in order to mount the respective corner 12a and 12b on the corresponding corners of device ED. Similarly, each of the corner pieces 12a and 12b is provided with a cavity 12c conformed for a stretched capture of the corresponding corner. Other cutouts 13 may also be provided to allow access to controls or carrying straps attached to the device (not shown).

The foregoing structure may be formed of any one of the several elastomeric materials, by casting, injection molding or other known process thereby forming elastomeric shields at the edge of the device. Preferably the material of this shielding structure includes some internal hysteresis for impact energy absorption, with further impact energy dissipation occurring in the frictional translations at the respective interfaces between the inventive apparatus and the device on which it is stretched.

Obviously, many modifications and variations are possible without departing from the spirit of the invention instantly disclosed. It is therefore intended that the scope of the invention be determined solely by the claims appended hereto.

It is claimed:

1. Apparatus for forming an impact attenuating set of shields along selected edge portions of an electronic device, comprising:

a generally rectangular, elongate recessed piece defined by a forward wall spaced in an adjacent alignment along a rear wall;

a first and second pocket structure; and a web connected between the ends of said piece and the respective ones of said pocket structures, said web being of a planar structure of a generally X-shaped plan form extending from the ends of said rear wall wherein said piece, said first and second pocket structures are formed of an elastomeric material structure said piece being conformed for elastic receipt of one edge of said electronic device and said web being conformed for elastic extension for inserting the ends of the opposite edge of said device in the respective ones of said first and second pocket structures.

2. Apparatus according to claim 1, wherein:

said piece and said first and second pocket structures are each formed to a thickness to project beyond the surfaces of said device received therein.

3. Apparatus useful as an impact attenuating set of shields along selected edges of an electronic device, comprising:

a generally rectangular, elongate recessed piece defined by a forward wall spaced in an adjacent alignment along a rear wall;

a first and second pocket structure;

a generally planar web of an X-shaped plan form connected between the ends of said rear wall of said piece and the respective ones of said pocket structures wherein said piece, said web and said first and second pocket structures are each formed of an elastomeric material, said piece being conformed for elastic receipt of one edge of said electronic device, said web being conformed for elastic extension for accommodating the insertion of the ends of the opposite edge of said device in the respective ones of said first and second pocket structures.

4. Apparatus according to claim 3, wherein:

said piece and said first and second pocket structures are each formed to a thickness to project beyond the surfaces of said device received therein.

5. Apparatus according to claim 4, wherein:

said electronic device includes a front and rear surface; and said web and said rear wall are aligned along said rear surface.

6. Apparatus for protecting an electronic device from impact damage, comprising:

an elastomeric elongate edge retaining piece defined by a front and rear wall to form a trough therebetween conformed for elastic receipt of one edge of said device;

an elastomeric web of a generally planar configuration and a generally X-shaped plan form extending from the ends of said rear wall along the proximate edge thereof and including a distal edge at the free ends thereof; and a first and second elastomeric corner receiving pocket attached to the respective ends of said free edge and adapted to engage the ends of the opposite edge of said device upon the elastic extension of said web.

7. Apparatus according to claim 6, wherein:

said piece and said first and second pockets are each formed to a thickness to project beyond the surfaces of said device received therein.

* * * * *